(12) United States Patent
Tomita

(10) Patent No.: US 11,399,071 B2
(45) Date of Patent: Jul. 26, 2022

(54) PROGRAM OPERATION SYSTEM AND PROGRAM OPERATION METHOD

(71) Applicant: HITACHI, LTD., Tokyo (JP)

(72) Inventor: Taminori Tomita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/835,542

(22) Filed: Mar. 31, 2020

(65) Prior Publication Data

US 2020/0329108 A1 Oct. 15, 2020

(30) Foreign Application Priority Data

Apr. 11, 2019 (JP) .............................. JP2019-075646

(51) Int. Cl.
*H04L 67/51* (2022.01)
*H04L 43/08* (2022.01)

(52) U.S. Cl.
CPC ........ *H04L 67/16* (2013.01); *H04L 29/08648* (2013.01); *H04L 43/08* (2013.01)

(58) Field of Classification Search
None
See application file for complete search history.

(56) References Cited

U.S. PATENT DOCUMENTS

| | | | | |
|---|---|---|---|---|
| 2006/0245383 A1* | 11/2006 | Ansari | ..................... | H04L 67/16 370/310 |
| 2009/0149968 A1* | 6/2009 | Hosoi | .............. | G01N 35/00594 700/21 |
| 2015/0347282 A1* | 12/2015 | Wingfors | ............ | G06F 11/3688 717/125 |
| 2017/0039133 A1* | 2/2017 | Rai | ...................... | G06F 11/3688 |
| 2017/0228408 A1* | 8/2017 | Sato | ....................... | G06F 16/162 |

FOREIGN PATENT DOCUMENTS

| | | | |
|---|---|---|---|
| CN | 108897557 A | * | 11/2018 |
| CN | 108897557 A | | 11/2018 |
| JP | 2013-228970 A | | 11/2013 |

OTHER PUBLICATIONS

Boyer et al., Architecture-Based Automated Updates of Distributed Microservices, Springer International Publishing, pp. 21-36, Nov. 7, 2018.
Extended European Search Report dated Aug. 18, 2020 for European Patent Application No. 20168690.4.

* cited by examiner

*Primary Examiner* — Lance Leonard Barry
(74) *Attorney, Agent, or Firm* — Volpe Koenig

(57) ABSTRACT

There is provided a microservice management unit that, in a service provided by executing one or a plurality of microservices, executes a pre-update service flow including a microservice before update and a post-update service flow including a microservice after update, and outputs an execution result of the pre-update service flow and an execution result of the post-update service flow, and a service update analysis processing unit that evaluates the execution result of the pre-update service flow and the execution result of the post-update service flow, and as a service flow in which the evaluation result satisfies a predetermined relation, selects either the pre-update service flow or the post-update service flow.

6 Claims, 7 Drawing Sheets

SERVICE FLOW MANAGEMENT TABLE 400

| SERVICE FLOW NAME (401) | Ver. (402) | FLOW INFORMATION (403) |
|---|---|---|
| SV_A | 1.0 | MC_A→MC_B→MC_C |
| SV_B | 1.0 | MC_A→MC_B→MC_D |
| SV_C | 1.1 | MC_B→MC_C→MC_D |
| SV_A1 | - | MC_A→MC_B1→MC_C |

FIG. 3

MICROSERVICE MANAGEMENT TABLE

| MICROSERVICE NAME | PROGRAM Ver. | MODEL Ver. | RELATED Web SERVICE LIST |
|---|---|---|---|
| MC_A | 1.0 | – | SERVICE A, SERVICE B, SERVICE A1 |
| MC_B | 1.0 | 1.0 | SERVICE A, SERVICE B, SERVICE C |
| MC_B1 | 1.1 | 1.1 | SERVICE A1 |
| MC_C | 1.0 | 1.0 | SERVICE A, SERVICE A1, SERVICE C |
| MC_D | 1.0 | 1.0 | SERVICE B, SERVICE C |

FIG. 4

SERVICE FLOW EVALUATION PROCESSING MANAGEMENT TABLE

| SERVICE FLOW NAME | KPI | EVALUATION PROCESS NAME |
|---|---|---|
| SV_A | DETECTION RATE | EV_A1 |
| SV_A | MISREPORT RATE | EV_A2 |
| SV_B | DETECTION RATE | EV_B1 |
| SV_B | MISREPORT RATE | EV_B2 |
| SV_C | ACCURACY | EV_C |

FIG. 5

SERVICE FLOW MANAGEMENT TABLE

| SERVICE FLOW NAME | Ver. | FLOW INFORMATION |
|---|---|---|
| SV_A | 1.0 | MC_A→MC_B→MC_C |
| SV_B | 1.0 | MC_A→MC_B→MC_D |
| SV_C | 1.1 | MC_B→MC_C→MC_D |
| SV_A1 | - | MC_A→MC_B1→MC_C |

FIG. 6

Web SERVICE MANAGEMENT TABLE

| Web SERVICE NAME | SERVICE FLOW NAME | Ver. | EVALUATION PROCESS |
|---|---|---|---|
| SERVICE A | SV_A | 1.0 | EV_A1 |
| SERVICE B | SV_B | 1.0 | EV_B2 |
| SERVICE C | SV_C | 1.1 | EV_C |
| SERVICE A1 | SV_A1 | - | EV_A1 |

FIG. 8

SERVICE FLOW MANAGEMENT TABLE

400

| SERVICE FLOW NAME (401) | Ver. (402) | FLOW INFORMATION (403) |
|---|---|---|
| SV_A | 1.0 | MC_A→MC_B→MC_C |
| SV_B | 1.0 | MC_A→MC_B→MC_D |
| SV_C | 1.1 | MC_B→MC_B→MC_D |
| SV_A | 1.1 | MC_A→MC_B1→MC_C |

FIG. 9

Web SERVICE MANAGEMENT TABLE

500

| Web SERVICE NAME (501) | SERVICE FLOW NAME (401) | Ver. (402) | EVALUATION PROCESS (303) |
|---|---|---|---|
| SERVICE A | SV_A | 1.1 | EV_A1 |
| SERVICE B | SV_B | 1.0 | EV_B2 |
| SERVICE C | SV_C | 1.1 | EV_C |
|  |  |  |  |

FIG. 10

MICROSERVICE MANAGEMENT TABLE

| MICROSERVICE NAME | PROGRAM Ver. | MODEL Ver. | RELATED Web SERVICE LIST |
|---|---|---|---|
| MC_A | 1.0 | — | SERVICE A, SERVICE B |
| MC_B | 1.0 | 1.0 | SERVICE B, SERVICE C |
| MC_B1 | 1.1 | 1.1 | SERVICE A |
| MC_C | 1.0 | 1.0 | SERVICE A, SERVICE C |
| MC_D | 1.0 | 1.0 | SERVICE B, SERVICE C |

PROGRAM OPERATION SYSTEM AND PROGRAM OPERATION METHOD

INCORPORATION BY REFERENCE

This application claims priority based on Japanese patent application, No. 2019-075646, filed on Apr. 11, 2019, the entire contents of which are incorporated herein by reference.

BACKGROUND

The present invention relates to a program operation system and a program operation method.

In recent years, with the development of SaaS (Software as a Service) technology, new services/software based on machine/deep learning are being provided as Web services. In particular, when a Web service is built by mashup of microservices (programs) provided by third parties, when individual microservices are upgraded by adding new functions or corrections, additional microservices are added. There is a need to test the features to be modified and evaluate the impact of those features on Web services.

JP 2013-228970 A discloses a conventional technique relating to a test when a program is upgraded. JP 2013-228970 A aims to provide an efficient method for upgrading a business system including a plurality of modules. In order to achieve this object, JP 2013-228970 A manages whether each module related to each function to be updated has been changed, and stores the updated function and the changed module in association with each other, so that the effective module is specified.

SUMMARY

In Web services constructed by mashup of microservices, microservices may be upgraded and functions may be added or changed. In such a case, it is necessary to test and verify the defects and effects that the upgraded microservices have on the entire Web service. In addition, since a plurality of types of Web services are provided and each has a different evaluation axis (KPI: Key Performance Indicator), whether to upgrade the microservice may differ depending on the Web service.

In JP 2013-228970 A, the module related to the function to be updated is specified and the change of the module is managed. However, it is not considered to evaluate the influence of the changed module, and how to do this is not disclosed. In addition, the case where a module is related to a plurality of functions is not considered.

An object of the present invention is to provide a program operation system and a program operation method capable of evaluating the influence of a changed program in a service provided by executing one or a plurality of programs.

A program operation system according to one embodiment of the invention includes a microservice management unit that, in a service provided by executing one or a plurality of microservices, executes a pre-update service flow including a microservice before update and a post-update service flow including a microservice after update, and outputs an execution result of the pre-update service flow and an execution result of the post-update service flow, and a service update analysis processing unit that evaluates the execution result of the pre-update service flow and the execution result of the post-update service flow, and as a service flow in which the evaluation result satisfies a predetermined relation, selects either the pre-update service flow or the post-update service flow.

According to the disclosure, it is possible to evaluate the effect of a changed program on a service provided by executing one or more programs.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a microservice management table according to the embodiment;

FIG. 4 is a service flow evaluation processing management table according to the embodiment;

FIG. 5 is a service flow management table according to the embodiment;

FIG. 6 is a Web service management table according to the embodiment;

FIG. 8 is an updated service flow management table according to the embodiment;

FIG. 9 is an updated Web service management table according to the embodiment; and FIG. 10 is an updated microservice management table according to the embodiment.

DESCRIPTION OF THE EMBODIMENTS

Figure 1:
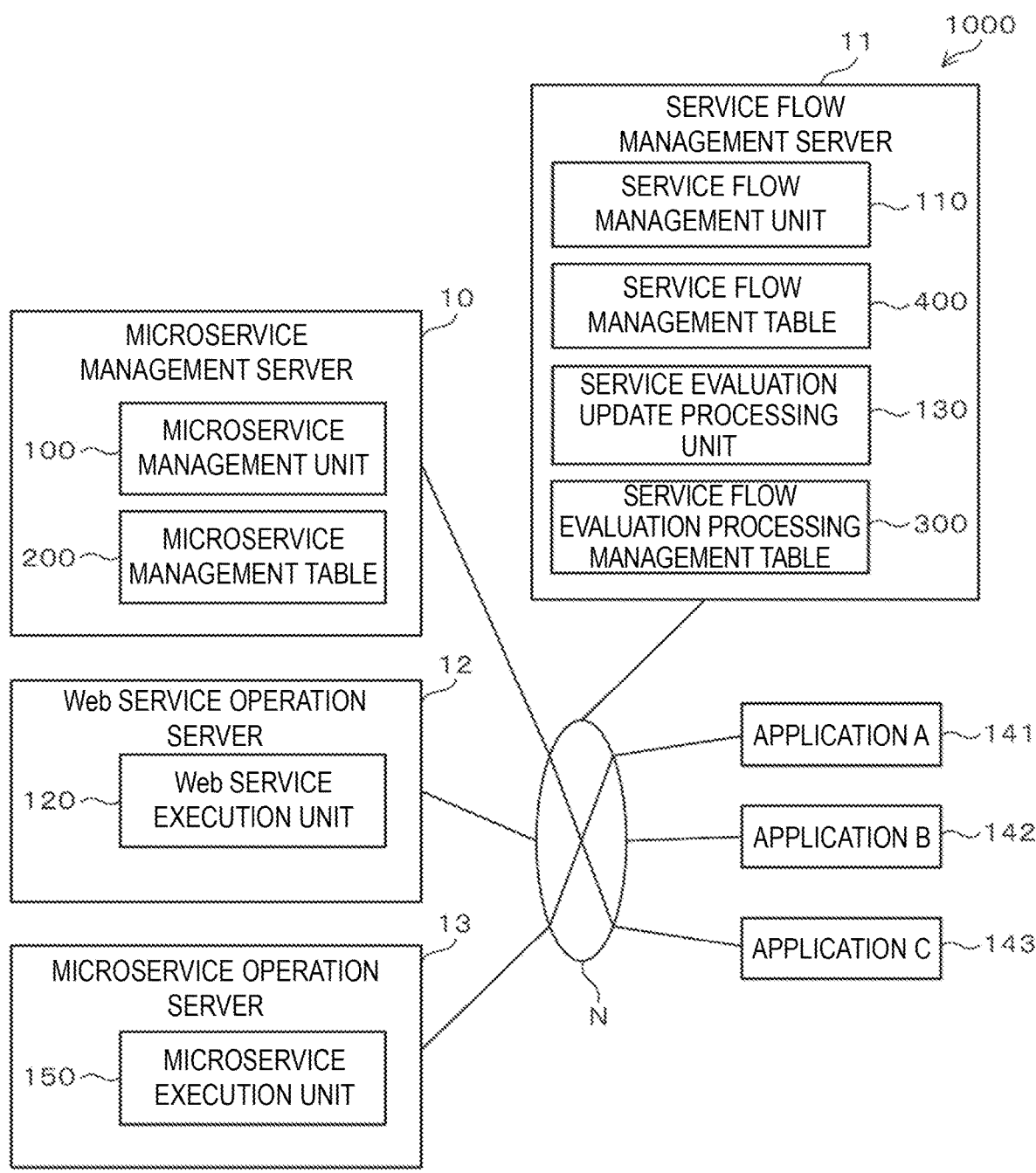
FIG. 1 is a diagram illustrating a system configuration according to an embodiment.

Hereinafter, embodiments of the present invention will be described with reference to the drawings. The following description and drawings are exemplifications for describing the present invention, and are omitted and simplified as appropriate for clarification of the description. The present invention can be implemented in other various forms. Unless otherwise limited, each component may be singular or plural.

The position, size, shape, range, and the like of each component illustrated in the drawings may not necessarily represent the actual position, size, shape, range, and the like, in order to facilitate understanding of the invention. For this reason, the present invention is not necessarily limited to the position, size, shape, range, and the like disclosed in the drawings.

In the following description, various types of information may be described using expressions such as "table" and "list". However, various types of information may be expressed by a data structure other than these. "XX table", "XX list", etc. may be called "XX information" to indicate that they do not depend on the data structure. In describing the identification information, expressions such as "identification information", "identifier", "name", "ID", and "number" are used, but these can be replaced with each other.

When there are a plurality of components having the same or similar functions, different subscripts may be given for the same reference numerals for explanation. However, when there is no need to distinguish between these components, the description may be omitted with subscripts omitted.

In addition, in the following description, a process to be performed by executing a program may be described. However, the program is executed by a processor (for example, a CPU or a GPU) so that a predetermined process is performed while using a storage resource (for example, memory) and/or an interface device (for example, communication port). Therefore, the subject of the process may be the processor. Similarly, the subject of the process performed by executing the program may be a controller, an apparatus, a system, a computer, or a node, which have a processor. The subject of the process performed by executing the program may be an arithmetic unit, and may include a dedicated circuit (for example, an FPGA or an ASIC) for performing a specific process.

The program may be installed on a device such as a computer from a program source. The program source may be, for example, a program distribution server or a computer-readable storage medium. In a case where the program source is a program distribution server, the program distribution server includes a processor and a storage resource for storing the program to be distributed, and the processor of the program distribution server may distribute the program to be distributed to another computer. In addition, in the following description, two or more programs may be expressed as one program, or one program may be expressed as two or more programs.

First Embodiment

FIG. 1 is a diagram illustrating a configuration of a program operation system of the present embodiment. As illustrated in FIG. 1, a program operation system 1000 includes a microservice management server 10, a service flow management server 11, a Web service operation server 12, and a microservice operation server 13, each of which is connected via a network N. An application A141, an application B142, and an application C143 are applications installed on a computer of a user who uses the Web service executed by the Web service execution unit 120.

Servers and computers of this system include, as hardware, storage devices such as an HDD (Hard Disk Drive) and an SSD (Solid State Drive), an arithmetic device which includes a CPU (Central Processing Unit), a RAM (Random Access Memory), and a ROM (Read Only Memory), and is configured as a general information processing device. In addition, the functions of the functional units of each server are realized by executing a program. For example, the function of each unit is realized by the CPU reading the program from the ROM and executing the program. The above program may be provided to each server by being read from a storage medium such as a USB (Universal Serial Bus) memory or downloaded from another computer via a network.

The Web service is a service that operates according to a service flow managed by a service flow management unit 110. For example, this corresponds to a processing flow of a program defined by connection of nodes representing so-called program processing by a visual programming tool represented by Node-RED or the like. If the processing flow is Node-RED, it is defined in a file format described in a predetermined format such as Flow.json, and by referring to this file, analyzing and processing, the following processing can be realized. In addition, the processing flow of the program defined in Node-RED can be used as a Web service that actually operates by being deployed on Node-RED. In addition, the microservice is realized as a container of Docker (registered trademark) which is a virtual environment, for example.

Therefore, for example, the microservice management server 10 is a server that provides a function of managing the Docker container. The service flow management server 11 is a server that provides a function of managing the processing flow. The Web service operation server 12 is a server on which Node-RED operates. The microservice operation server 13 can be mounted as a server on which Docker operates.

The service flow in this embodiment includes processing of one or more microservices, and the microservice calls, for example, a service operated by a microservice execution unit 150 in the flow.

The microservice is managed by a microservice management unit 100 of the microservice management server 10. Then, in a case where an update such as version upgrade of the microservice occurs, the microservice management unit 100 temporarily generates a service flow (updated service flow) reflecting the update, and generates a flow to operate a parallel process with the same input as the service flow before updating. Further, the microservice management unit 100 deploys a Web service to which a flow for comparing and evaluating the output of the updated service flow and the output of the service flow before update is added.

Then, each time the Web service is used from the application, the updated service flow and the service flow before updating can be evaluated. As a result of the evaluation, either the updated service flow or the pre-update flow, whichever is better, is selected. The selected service flow is newly deployed as a Web service, and the service flow management table 400 and the microservice management table 200 are updated. As a result of updating the microservice management table 200, the microservice of the old version, which has no relevant service, is deleted.

Figure 2:
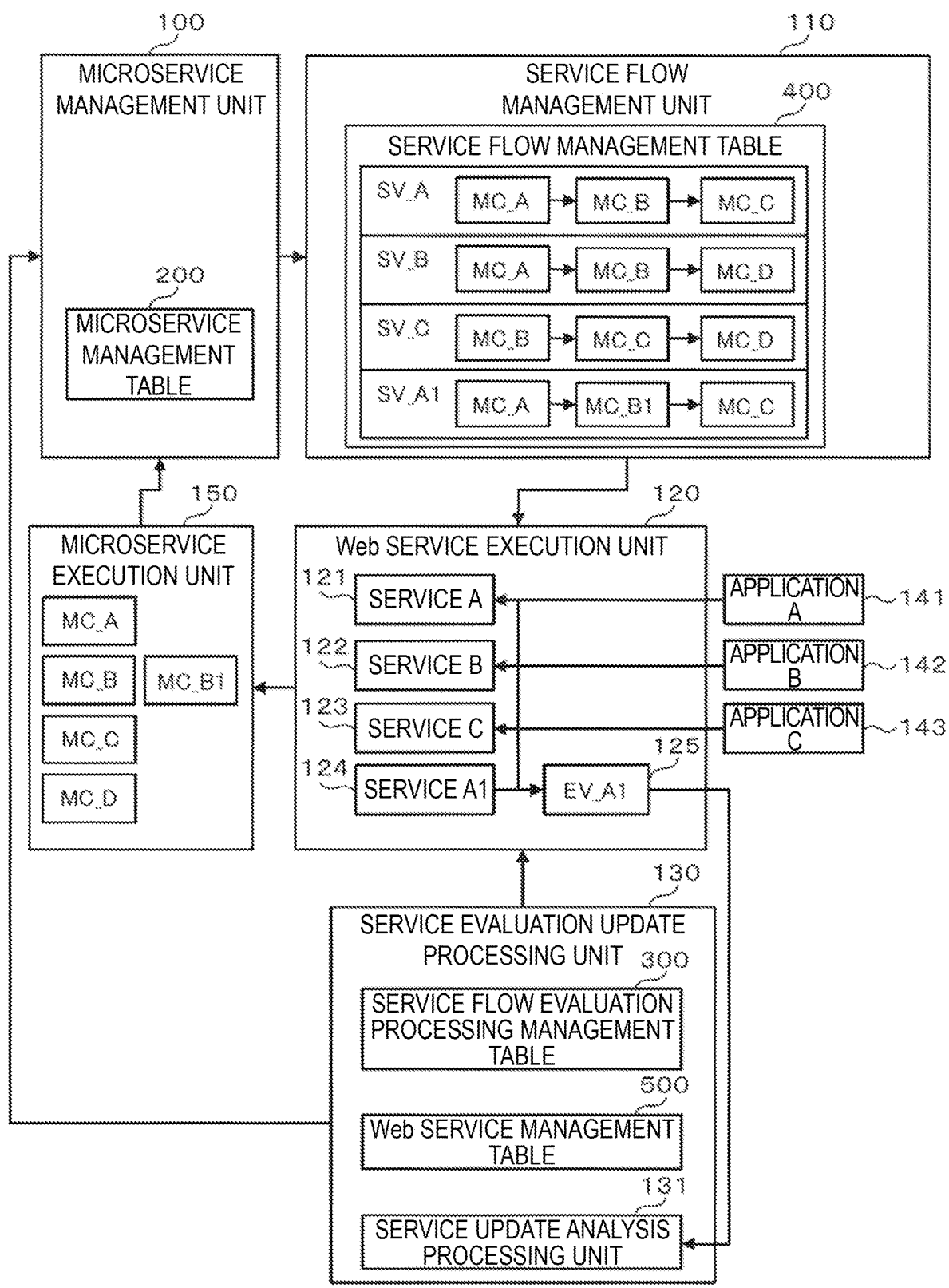
FIG. 2 is a diagram illustrating an outline of a target process according to the embodiment.

Hereinafter, the details of this processing will be described with reference to the drawings. FIG. 2 is a diagram illustrating an outline of a target process. The service operated by the microservice execution unit 150 is managed by the microservice management table 200 of the microservice management unit 100. Although specifically described later, in this system, the microservice management unit 100 executes a pre-update service flow including a pre-update microservice and a post-update service flow including a post-update microservice in a service to be provided by executing one or a plurality of microservices (programs), outputs the execution result of the pre-update service flow and the execution result of the post-update service flow. A service update analysis processing unit 131 of a service evaluation update processing unit 130 evaluates the execution result of the pre-update service flow and the execution result of the post-update service flow, selects either the pre-update service flow or the post-update service flow as the service flow in which the evaluation result satisfies a predetermined relation, and registers the selected service flow as a new service flow. Thereby, in a service provided by executing one or a plurality of programs, it is possible to evaluate the influence of the changed program. For example, even in a case where the program is changed, it is possible to automatically evaluate which service before and after the change of the program is suitable as a service to be provided.

In addition, the service update analysis processing unit 131 selects a service flow with a high evaluation result as a service flow whose evaluation result satisfies a predetermined relation. Therefore, by executing a service flow with a high evaluation (for example, a KPI value), a service with a higher degree of satisfaction than the service before updating can be provided. In the following, a service flow with a high KPI value is described as an example of a service flow that satisfies a predetermined relation. However, it may determine whether the service flows before and after updating satisfy a predetermined relation in a case of a low KPI value, or using other values such as KGI (Key Goal Indicator).

FIG. 3 illustrates a configuration diagram of the microservice management table 200. As illustrated in FIG. 3, the microservice management table 200 is configured by a microservice name 201, a program version 202 indicating a program version, a model version 203 indicating program learning data, a parameter set, or the like, and a relevant service 204 indicating a service flow which uses the microservice. For example, a microservice MC_A in the drawing indicates that the program version is 1.0, there is no model version, and the relevant services are service A, service B, and service A1.

The service flow management unit 110 manages a service flow constructed by combining the microservices with a service flow management table 400.

FIG. 5 illustrates a configuration diagram of the service flow management table 400. As illustrated in the drawing, the service flow includes a service flow name 401, a service flow version 402, and flow information 403. For example, the service SV_A (service A) is version 1.0, and the flow is configured to operate in the order of microservices MC_A, MC_B, and MC_C.

The service flow managed by the service flow management unit 110 can operate as a Web service that can be used by an application by being deployed to the Web service execution unit 120.

For each service flow, processing for evaluating the processing result is defined, and the processing is managed in the service flow evaluation processing management table 300 of the service evaluation update processing unit 130.

FIG. 4 illustrates a configuration diagram of the service flow evaluation processing management table 300. As illustrated in the drawing, a service flow name 301, an evaluation process index KPI 302, and an evaluation process name 303 are provided. For example, the service SV_A is a process of evaluating with a detection rate, and indicates that evaluation is performed by an evaluation process EV_A1. It is also possible to prepare multiple evaluation processes in the service flow, and select the evaluation process when deployed as a Web service. The deployed Web service is managed by the Web service management table 500.

FIG. 6 illustrates a configuration diagram of the Web service management table 500. As illustrated in the drawing, the Web service management table 500 includes a Web service name 501, a service flow name 401, a service flow version 402, and an evaluation process 303. For example, the service A of the Web service is a service in which the service flow SV_A of version 1.0 is deployed, and the evaluation process is performed by EV_A1.

In the microservice execution unit 150 in FIG. 2, a situation in which an MC_A, MC_B, MC_C, and MC_D are operating, and updated MC_B1 of the microservice of MC_B is newly provided is illustrated.

Figure 7:
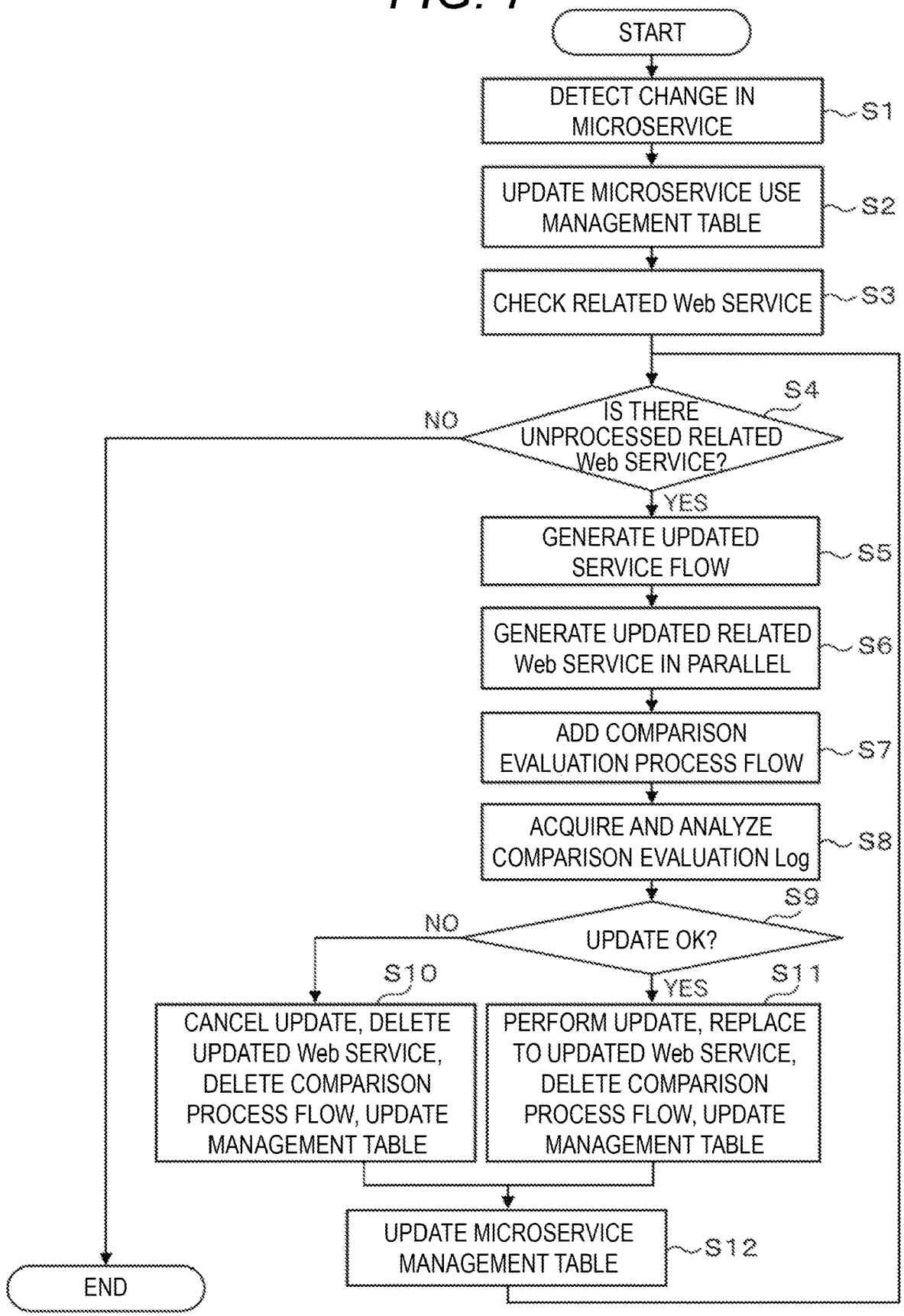
FIG. 7 is a flowchart according to the embodiment.

Hereinafter, the details of the processing of this embodiment will be described using the flowchart of FIG. 7. In FIG. 7, it is assumed that all services including the updated microservice are executed.

The microservice management unit 100 detects the execution of the microservice MC_B1, which is an updated version of the microservice MC_B. As a detection method, for example, the microservice management unit 100 registers the updated microservice updated by the microservice developer in the microservice management table 200, or detects the update in cooperation with a version control system such as Git (Step 1).

Next, the microservice management unit 100 registers the updated and detected microservice in the microservice management table 200. In the example of FIG. 3, the microservice management unit 100 detects the update of MC_B and registers the updated MC_B1, and sets the updated program version and model version (Step 2).

Next, the microservice management unit 100 checks, from the microservice management table 200, the presence/absence and configuration of a Web service related to the microservice MC_B whose update has been detected. In the example of FIG. 3, the microservice management unit 100 confirms that service A, service B, and service C exist as Web services related to MC_B (Step 3).

The microservice management unit 100 performs processing on service flow information corresponding to the service flow and version of each Web service. If there is an unprocessed related Web service (Step 4; Yes), the process proceeds to Step 5, and if there is no unprocessed related Web service (Step 4; No), the process ends (Step 4).

Hereinafter, a case where the unprocessed related Web service is service A will be described as an example. The microservice management unit 100 refers to the Web service management table 500 illustrated in FIG. 6 and reads SV_A as the service flow of the service A, and 1.0 as Ver. The microservice management unit 100 refers to the service flow management table 400, generates an updated service flow in which MC_B is changed to MC_B1, and registers the updated service flow in the service flow management table 400. In FIG. 5, the microservice management unit 100 registers the service flow SV_A1 as a flow whose SV_A has been updated. The updated flow information is MC_A→MC_B1→MC_C (Step 5).

Next, the microservice management unit 100 generates a Web service of the service flow generated in Step 5, and registers the Web service in the Web service management table 500. In the case of SV_A1, the microservice management unit 100 registers the service A1 in the Web service management table 500 in FIG. 6 as an updated Web service. As the evaluation process, the microservice management unit 100 registers EV_A1 same as the service A before updating, and registers SV_A1 as the service flow. In addition, in a case where a Web service is generated, the microservice management unit 100 also updates the related Web service list in the microservice management table 200. In FIG. 3, the microservice management unit 100 adds the service A1, which is the updated Web service, to the microservices MC_A, MC_B1, and MC_C (Step 6).

Next, the microservice management unit 100 adds a process of comparing and evaluating the updated Web service generated in Step 6 and the original Web service. In a case where the service to be compared and evaluated is the service A1 and the service A, the microservice management unit 100 inputs the result of each service to the evaluation process EV_A1. The evaluation process includes a process of evaluating a service result with a predetermined KPI, a process of comparing and analyzing the evaluation results of each service, and a process of recording the analysis result in a log (Step 7).

Even in a situation where the comparison evaluation process of the updated Web service and the original Web service is deployed in Step 6, the application can continue to use the original Web service, but the Web service execution unit 120 executes the Web service before updating (for example, service A) in parallel with the Web service after updating (for example, service A1), and the execution result of the two and the comparison result of the two are accumulated in a log. The service update analysis processing unit 131 analyzes the log after a predetermined number of uses or a predetermined period has elapsed, evaluates which service is superior, and determines whether the Web service can be updated as a result (Step 8).

In the log analysis, the microservice management unit 100 may execute the pre-update service flow and the post-update service flow a predetermined number of times, and in the following process, the service update analysis processing unit 131 may select a service flow with a high evaluation result using a statistical value of the evaluation of the execution result of the pre-update service flow and a statistical value of the evaluation of the execution result of the post-update service flow obtained by executing the predetermined number of times, and registers the service flow as a new service flow. As the statistical value, various statistical values such as an average value and a median value can be used.

The service update analysis processing unit 131 executes an update canceling process (Step 10) in a case where the original Web service is excellent and it is not determined that the Web service may be updated as a result of the evaluation (Step 9; No). On the other hand, in a case where the service update analysis processing unit 131 determines that the original Web service is not excellent and the Web service can be updated (Step 9; Yes), the process proceeds to the update process (Step 11).

In the update canceling process, the service update analysis processing unit 131 deletes the updated Web service and a comparison and evaluation process. In addition, the corresponding Web service in the Web service management table 500 and the corresponding service flow in the service flow management table 400 are deleted. In addition, the service update analysis processing unit 131 deletes the corresponding Web service from the related Web service list of the microservice management table 200. In FIG. 3, the service update analysis processing unit 131 deletes the service A1 from the Web service list related to MC_A, MC_B1, and MC_C (Step 10).

In the update process, the service update analysis processing unit 131 deletes the original Web service and the comparison and evaluation process. In addition, the service update analysis processing unit 131 also temporarily deletes the service A1 of the updated Web service, deletes the service A in the Web service management table 500, and changes the service A1 to the service A. Further, the service update analysis processing unit 131 changes SV_A1 of the service flow management table 400 to SV_A, registers the version with an incremented version of the original service flow version, and then deploys version 1.1 of the service flow SV_A as the Web service A.

FIG. 8 illustrates the service flow management table after the update process. FIG. 9 illustrates the Web service management table after the update process. In FIG. 8, it can be seen that the service update analysis processing unit 131 has registered the updated service flow SV_A1 as version 1.1 of SV_A. In addition, in FIG. 9, it can be seen that the service update analysis processing unit 131 has deleted the updated Web service A1 and has registered the Web service A as version 1.1. Further, the service update analysis processing unit 131 deletes the service A in the related Web service list of the microservice management table 200, and changes the service A1 to the service A. FIG. 10 illustrates the microservice management table after the update process In FIG. 10, it can be seen that as a result of the service A being deleted and the service A1 being changed to the service A, for example, only the service A and the service C are registered in the Web service list related to the microservice MC_C (Step 11).

After Step 10 or Step 11, the microservice management unit 100 updates the microservice management table 200. The microservice management unit 100 deletes the record of the microservice in the microservice management table 200 in a case where the related Web service list is blank in the old version of the microservice, that is, when there is no Web service being used (Step 12).

As described above, the service update analysis processing unit 131 evaluates other services (for example, SV_B) than the evaluated service (for example, SV_A) among a plurality of services including microservices (for example, MC_B) included in the selected service flow (for example, SV_A). In a case where not all of the changed microservices (for example, MC_B) have been selected from the other services (for example the service flows including MC_B such as SV_B) (that is, MC_B before changing has not obtained a high evaluation), the unselected service flow of the service flow before updating and the service flow after updating (for example, a service whose KPI value is evaluated to be low) is deleted from the program operation system 1000. Therefore, in a case where a microservice included in a certain service is changed, it is possible to eliminate the erroneous deletion of the changed microservice used in another service or a service including the microservice.

As described above, processing on one Web service is completed by the processes from Step 5 to Step 12. Next, the process proceeds to Step 4 again, and the processes are repeated until there is no unprocessed Web service.

As described above, in the present embodiment, the microservice management unit 100 determines whether there is a related Web service for each microservice version by analyzing the configuration information of the Web service, and records the result as a table to manage. The service flow management unit 110 manages the service flow configuration information representing the service flow information indicating the processing flow of the microservice of the Web service. In a case where a version update of the microservice occurs in a system where a service is deployed and executable on the basis of the service flow configuration information, the Web service execution unit 120 configures and deploys the updated service flow in which the running Web services related to all other versions of the microservice are replaced with the updated microservices. In this system, a KPI for evaluating the Web service is calculated, and a process for comparing the original Web service with the updated Web service is deployed. In a case where a service request is received from a user via a Web service, the system executes both the original Web service and the update Web service in response to the request, and calculates the KPI from the result of both services, and records the comparison result in a log.

After the service request is executed a predetermined number of times, the accumulated log is analyzed. In a case where the KPI has not deteriorated, the original Web service and the updated Web service are replaced, and the Web service configuration information table and the service flow configuration information are updated. On the other hand, in a case where the KPI has deteriorated, the update Web service is deleted. Thus, for example, in a case where a business service provided as a Web service is updated when being established by a plurality of subprograms, a so-called microservice mashup, when a microservice version update occurs, it is possible to manage Web services by utilizing the microservices without deteriorating the quality.

Although the present disclosure has been described with reference to example embodiments, those skilled in the art will recognize that various changes and modifications may be made in form and detail without departing from the spirit and scope of the claimed subject matter.

What is claimed is:

1. A program operation system, comprising:
one or more processors and
one or more non-transitory computer-readable storage media, the non-transitory computer-readable storage media having stored thereon at least
a microservice management unit and
a service update analysis processing unit wherein:
the microservice management unit, executes a pre-update service flow, of a first service, including a first microservice before update and a post-update service flow, of the first service, including the first microservice after update, and outputs a first execution result of the pre-update service flow and a second execution result of the post-update service flow;
the service update analysis processing unit evaluates the first execution result of the pre-update service flow and the second execution result of the post-update service flow, and in a case in which a result the evaluation satisfies a predetermined relation, selects either the pre-update service flow or the post-update service flow based on the result of evaluation;
wherein the service update analysis processing unit evaluates a second service, other than the first service, that include the first microservice and selects either a service flow for the second service including the first microservice before update or a service flow for the second service including the first microservice after update, and deletes the service flow for the second service that is not selected from the program operation system.

2. The program operation system according to claim 1, wherein the service update analysis processing unit selects a service flow having a high evaluation result as a service flow whose evaluation result satisfies a predetermined relation.

3. The program operation system according to claim 2, wherein the microservice management unit executes the pre-update service flow and the post-update service flow a predetermined number of times, and
wherein the service update analysis processing unit selects a service flow with a high evaluation result using a statistical value of an evaluation of the execution result of the pre-update service flow and a statistical value of an evaluation of the execution result of the post-update service flow obtained by the execution of the predetermined number of times.

4. A program operation method, comprising:

executing one or a plurality of microservices, executing a pre-update service flow, of a first service, including a first microservice before update and a post-update service flow, of the first service, including the first microservice after update, outputting a first execution result of the pre-update service flow and a second execution result of the post-update service flow, evaluating the first execution result of the pre-update service flow and the second execution result of the post-update service flow, selecting, in a case in which a result of the evaluation satisfies a predetermined relation, the pre-update service flow or the post-update service flow based on the result of the evaluation, evaluating a second service, other than the first service, that include the first microservice, selecting a service flow for the second service that includes the first microservice before update or a service flow for the second service that includes the first microservice, and deleting the service flow for the second service that is not selected, from the program operation system.

5. The program operation method according to claim 4, further comprising
selecting a service flow having a high evaluation result as a service flow whose evaluation result satisfies a predetermined relation.

6. The program operation method according to claim 5, further comprising
executing the pre-update service flow and the post-update service flow a predetermined number of times, and
selecting a service flow with a high evaluation result using a statistical value of an evaluation of the execution result of the pre-update service flow and a statistical value of an evaluation of the execution result of the post-update service flow obtained by the execution of the predetermined number of times.

* * * * *